(12) United States Patent
Wang et al.

(10) Patent No.: US 7,077,680 B1
(45) Date of Patent: Jul. 18, 2006

(54) MODULE CONNECTOR

(75) Inventors: Chin Chou Wang, Tucheng (TW); Yi Chiu Kao, Tucheng (TW); Chung Hsin Huang, Tucheng (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 0 days.

(21) Appl. No.: 11/073,644

(22) Filed: Mar. 8, 2005

(51) Int. Cl.
*H01R 13/62* (2006.01)

(52) U.S. Cl. ........................................ 439/331; 439/72

(58) Field of Classification Search ................ 439/330, 439/331, 342, 72, 73, 259, 266, 525, 526
See application file for complete search history.

(56) References Cited

U.S. PATENT DOCUMENTS

| | | | | |
|---|---|---|---|---|
| 4,359,252 A | * | 11/1982 | Olsson et al. ................. | 439/71 |
| 4,381,131 A | * | 4/1983 | Demnianiuk ................ | 439/368 |
| 4,433,886 A | * | 2/1984 | Cassarly et al. ............... | 439/65 |
| 4,502,747 A | * | 3/1985 | Bright et al. ................ | 439/296 |
| 6,648,664 B1 | * | 11/2003 | McHugh et al. ............ | 439/331 |
| 6,752,645 B1 | * | 6/2004 | Nakamura et al. .......... | 439/330 |
| 2005/0048829 A1 | * | 3/2005 | Nishio et al. ................ | 439/331 |

* cited by examiner

*Primary Examiner*—Hien Vu
(74) *Attorney, Agent, or Firm*—Rosenberg, Klein & Lee

(57) ABSTRACT

The present invention provides a module connector including a housing having four sidewalls that define a chamber for receiving a module therein. Each sidewall defines a plurality of contact recesses. A plurality of contacts is accommodated in the contact recesses and electrically contact with the module. A pivotal cover has a top pressing cover, at least a pivotal arm and at least a locking claw extending downwardly from the top pressing cover. The pivotal arm pivotally mounts the pivotal cover on the housing to enable the pivotal cover to pivot between an open position to enable the module to be inserted in the chamber and a closed position with the top pressing cover pressing downwardly on the top of the module to prevent the module from being pulled out. The locking claw latches the pivotal cover in the closed position.

7 Claims, 11 Drawing Sheets

MODULE CONNECTOR

BACKGROUND OF THE INVENTION

1. Field of the Invention

The present invention relates to a module connector, especially to a module connector to retain a digital camera lens module.

2. The Related Art

Nowadays, digital photographing technology is widely used in people's daily life. More and more electronic devices are desired to integrate photographing function thereon. To integrate the photographing function, a digital camera lens module must be assembled to the electronic device. The most common solution to assemble the module is to provide a module connector in the electronic device for fitting the module therein.

Japan patent application No. 2004-241225 published on Aug. 26, 2004 discloses a module connector for a digital camera lens module. The module connector includes a square box-like housing with four sidewalls surrounding a chamber to accommodate the digital camera lens module. Each sidewall holds a plurality of contacts in its inner surface. Each contact extends into the chamber to form a contact projection. When the module is inserted into the chamber, the contact projections prop themselves against sides of the module and pressingly contact contact pads of the module to prevent the module from moving horizontally relative to the module connector.

The module connector further includes four metal boards. The top of each board bends into a pair of clamping pieces at opposite ends thereof to clamp the metal board on the corresponding sidewall of the housing. A pull-out prevention piece is formed between the pair of clamping pieces for pressing on the top of the module to prevent the module from moving vertically relative to the module connector.

However, when the digital camera lens module is needed to be pulled out from the module connector, a special tool for pushing the pull-out prevention pieces aside is required, which makes it cumbersome to operate and is easy to damage the module.

SUMMARY OF THE INVENTION

An object of the present invention is to provide a module connector comprising a housing having four sidewalls that define a chamber for receiving a module therein. Each sidewall defines a plurality of contact recesses. A plurality of contacts is accommodated in the contact recesses and electrically contact with the module. A pivotal cover has a top pressing cover, at least a pivotal arm and at least a locking claw extending downwardly from the top pressing cover. The pivotal arm pivotally mounts the pivotal cover on the housing to enable the pivotal cover to pivot between an open position to enable the module to be inserted in the chamber and a closed position with the top pressing cover pressing downwardly on the top of the module to prevent the module from being pulled out. The locking claw latches the pivotal cover in the closed position. Pivoting the pivotal cover to the open position, the module can be pulled out. So no special tool is required. Furthermore, the contacting area between the top pressing cover and the module is enlarged to provide enough force to prop against the module thereby retaining the module in the module connector reliably.

Another object of the present invention is to provide a module connector further including a shell having four side-clipping panels wrapping the respective sidewalls of the housing. Each side-clipping panel has a pressing piece extending into the chamber to prop against the side of the module, thereby retaining the module in the module connector tightly and reliably.

Other objects, advantages and novel features of the invention will become more apparent from the following detailed description when taken in conjunction with the accompanying drawings.

DETAILED DESCRIPTION OF THE PREFERRED EMBODIMENT

Figure 1:
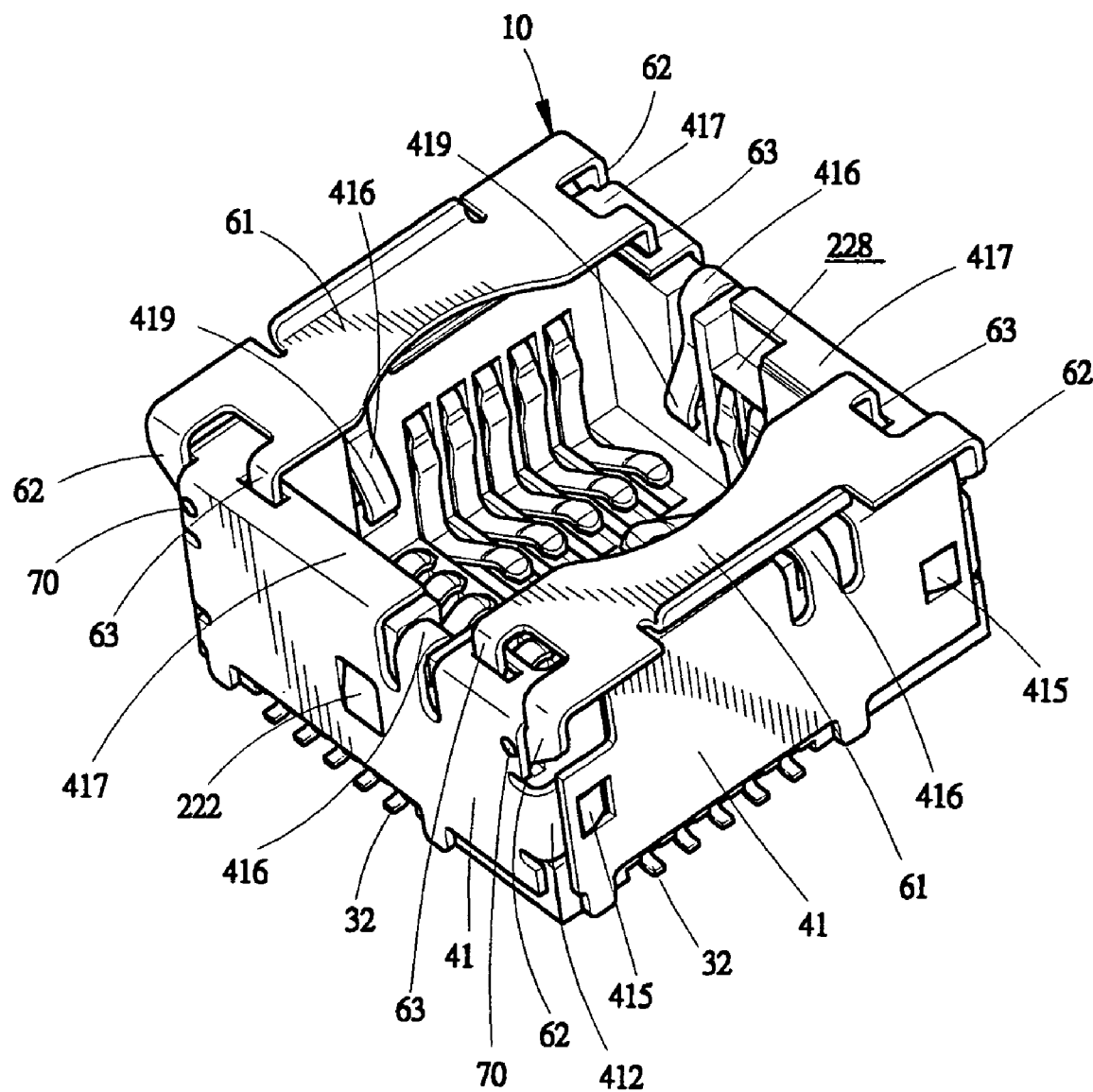
FIG. 1 is an assembled perspective view of a module connector according to the present invention.
Figure 2:
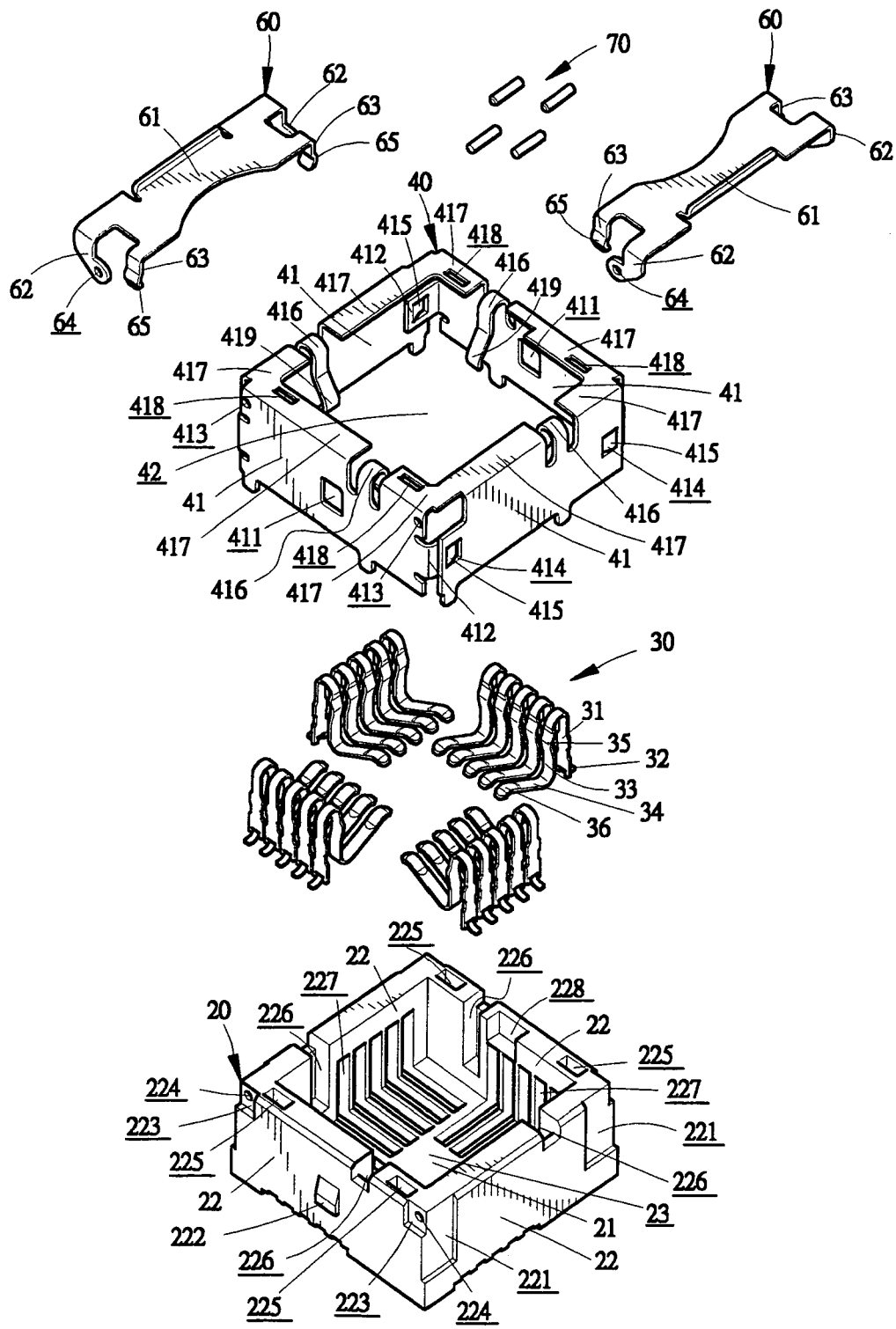
FIG. 2 is an exploded perspective view of the module connector shown in FIG. 1.

Now, referring to the drawings in greater detail, and first to FIGS. 1 and 2, the module connector 10 of the present invention includes a housing 20 receiving a plurality of contacts 30 therein, a shell 40 wrapping the housing 20, and a pivotal cover 60 pivotally mounted on the housing 20 by several positioning studs 70.

The housing 20 includes a bottom board 21 and four sidewalls 22 extending perpendicularly and upwardly from four edges of the bottom board 21 to define an upwardly-open chamber 23. Embedding recesses 221 are defined in outer sides of the left and the opposite right sidewalls 22. The front sidewall 22 and the opposite rear sidewall 22 respectively have an engagement protrusion 222 projected outwardly on about the middle portions of the outer sides thereof, two engagement-rotating recesses 223 in the upper corners of the outer sides thereof, and two stud-receiving holes 224 communicating with the corresponding engagement-rotating recesses 223 and open to outer sides of the front and rear sidewalls 22. Four locking recesses 225 are defined on the top of the front and rear sidewalls 22 adjacent to the corresponding stud-receiving holes 224. Each sidewall 22 has an inverted L-shaped propping recess 226 including a horizontal portion in the top of the sidewall 22 and a vertical portion in the inner side of the sidewall 22. A plurality of parallel contact recesses 227 is disposed in the inner surface of the housing 20. Each contact recesses 227 is L-shaped with a vertical part in the inner side of the sidewall 22 and a horizontal part in the bottom board 21. The rear sidewall 22 further provides a foolproof recess 228 open to the top surface and the inner side thereof.

Each contact 30 has an inverted U-shaped portion with one leg serving as a retention portion 31 to secure the contact 30 in the corresponding contact recess 227 and the other leg serving as an elastic pressing arm 33. Free end of the retention portion 31 is bent sideward to form a soldering portion 32. Free end of the pressing arm 33 is bent sideward and extends slantingly and upwardly to form a contact arm 34. A touching portion 35 is protruded from the nearly middle of a pressing arm 33 towards the corresponding contact arm 34. A contact portion 36 is formed on the most protrudent portion of the contact arm 34.

The shell 40 including four side-clipping panels 41 is a one-piece component fabricated of metal material. So only one action is needed to assemble such shell 40 with the housing 20 thereby simplifying the assembling of the module connector 10. In the meanwhile, the integrative structure of the shell 40 can enhance the stableness of the assembly. The four side-clipping panels 41 define an accommodating room 42 having an open top end and an open bottom end. The front side-clipping panel 41 and the back side-clipping panel 41 respectively have a hole 411 in the nearly middle part thereof and a pair of locking arms 412 at two sides extending towards the accommodating room 42 with barbs 415 thereon for engagement with mounting holes 414 in the left side-clipping panel 41 and the right side-clipping panel 41. Each side of the shell 40 has a pressing piece 416 and a top cover 417 bent towards the inside of the shell 40. The front side-clipping panel 41 and the back side-clipping panel 41 further respectively have a pair of installing holes 413 corresponding to the stud-receiving holes 224, and a pair of locking holes 418 in the respective top covers 417 corresponding to the locking recesses 225 for engagement with the pivotal covers 60. The pressing pieces 416 extend downwardly into the accommodating room 42 and form pressing points 419 projecting towards center of the accommodating room 42.

The pivotal cover 60 fabricated of metal material has a top pressing cover 61, a pair of pivotal arms 62 and a pair of locking claws 63 extending downwardly from opposite ends of the pressing cover 61. Each pivotal arm 62 has a positioning hole 64. Each locking claw 63 has a hook 65.

Figure 3:
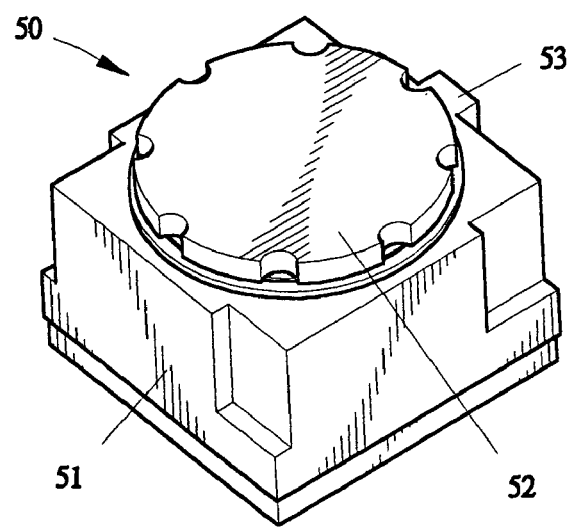
FIG. 3 is a perspective view of a digital camera lens module to be fitted in the module connector.

As illustrated in FIG. 3, a digital camera lens module 50 to be fitted in the module connector 10 comprises a base 51 with a lens base 52 at the top thereof, a plurality of contact pads (not shown) on the bottom of the lens module 50, and an foolproof protrusion 53 for engaging with the foolproof recess 228 of the housing 20.

Figure 4:
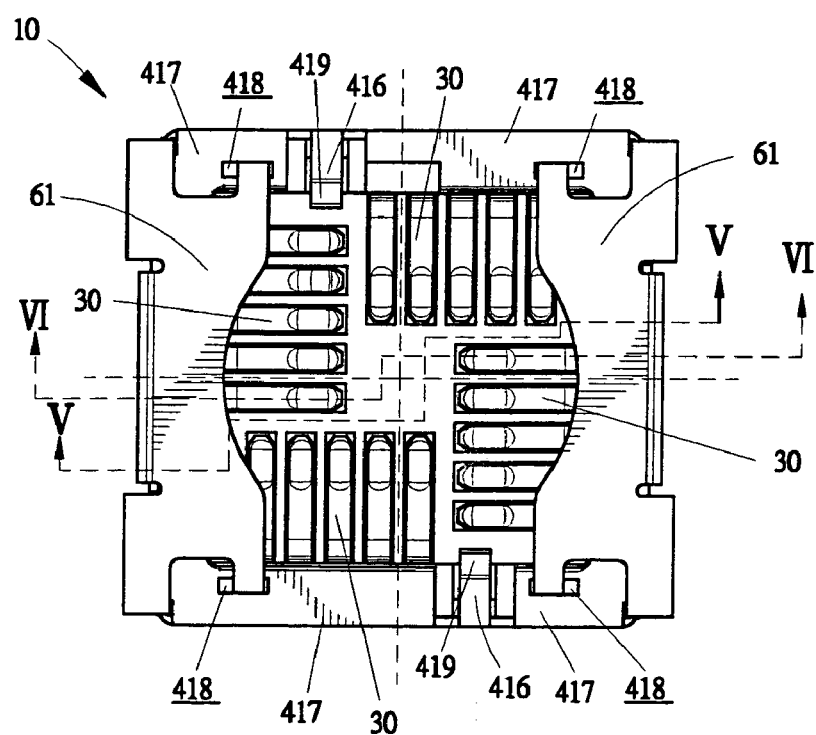
FIG. 4 is a top plan view of the module connector shown in FIG. 1.
Figure 5:
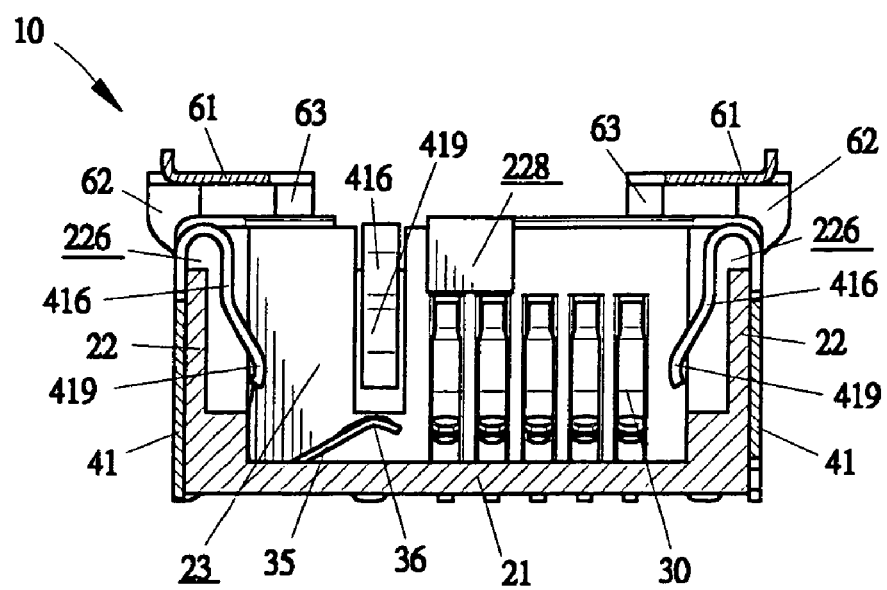
FIG. 5 is a cross-sectional view of the module connector taken along line V—V of FIG. 4.
Figure 6:
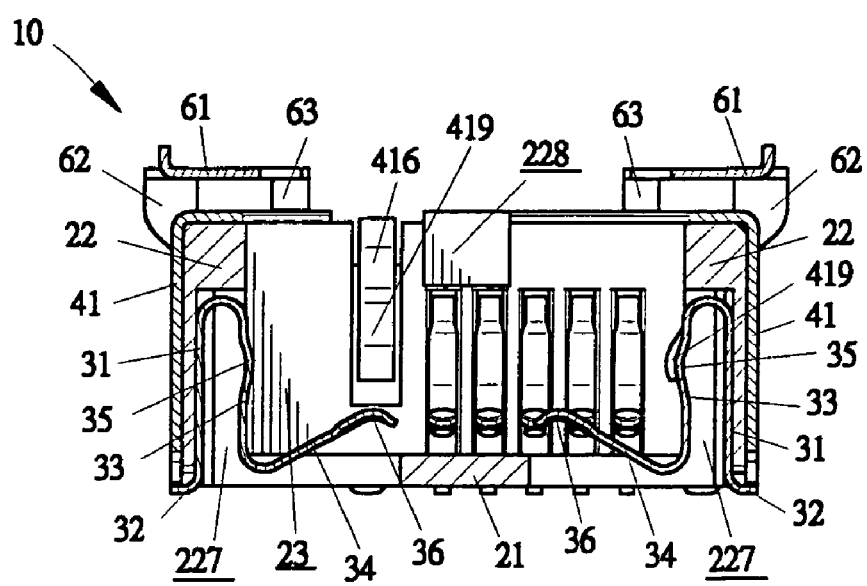
FIG. 6 is a cross-sectional view of the module connector taken along line VI—VI of FIG. 4.

Please further refer to FIGS. 4, 5 and 6. In assembly, the retention portion 31 of each contact 30 is interfereferingly engaged with the corresponding contact recess 227 of the housing 20 thereby securing the contact 30 in the contact recess 227. The pressing arm 33 is received in vertical portion of the contact recess 227, and the contact arm 34 is accommodated in the horizontal portion of the contact recess 227. The touching portion 35 of the pressing arm 33 and the contact portion 36 of the contact arm 34 are exposed out of the corresponding contact recess 227 and extend into the chamber 23. The housing 20 with contacts 30 therein are inserted in the accommodating room 42 of the shell 40 from the open bottom end. The protrusion 222 of the housing 20 is retained in the corresponding hole 411 of the shell 40, whereby the shell 40 is restrained from movement upwardly relative to the housing 20. The top covers 417 of the shell 40 cover the top surfaces of the sidewalls 22 of the housing 20, whereby the shell 40 is restrained from movement downwardly relative to the housing 20. The locking arms 412 of the shell 40 are received in the embedding recesses 221 of the housing 20, whereby the housing 20 is wrapped by the shell 40 tightly. The pressing pieces 416 of the shell 40 each pass through the horizontal portion of the corresponding propping recess 226 and then extend into vertical portion of the propping recess 226. While the pressing points 419 of the pressing pieces 416 extend into the chamber 23, therefore the chamber 23 and the vertical portion of the propping recess 226 provides the pressing points 419 enough space to bias elastically.

Figure 7:
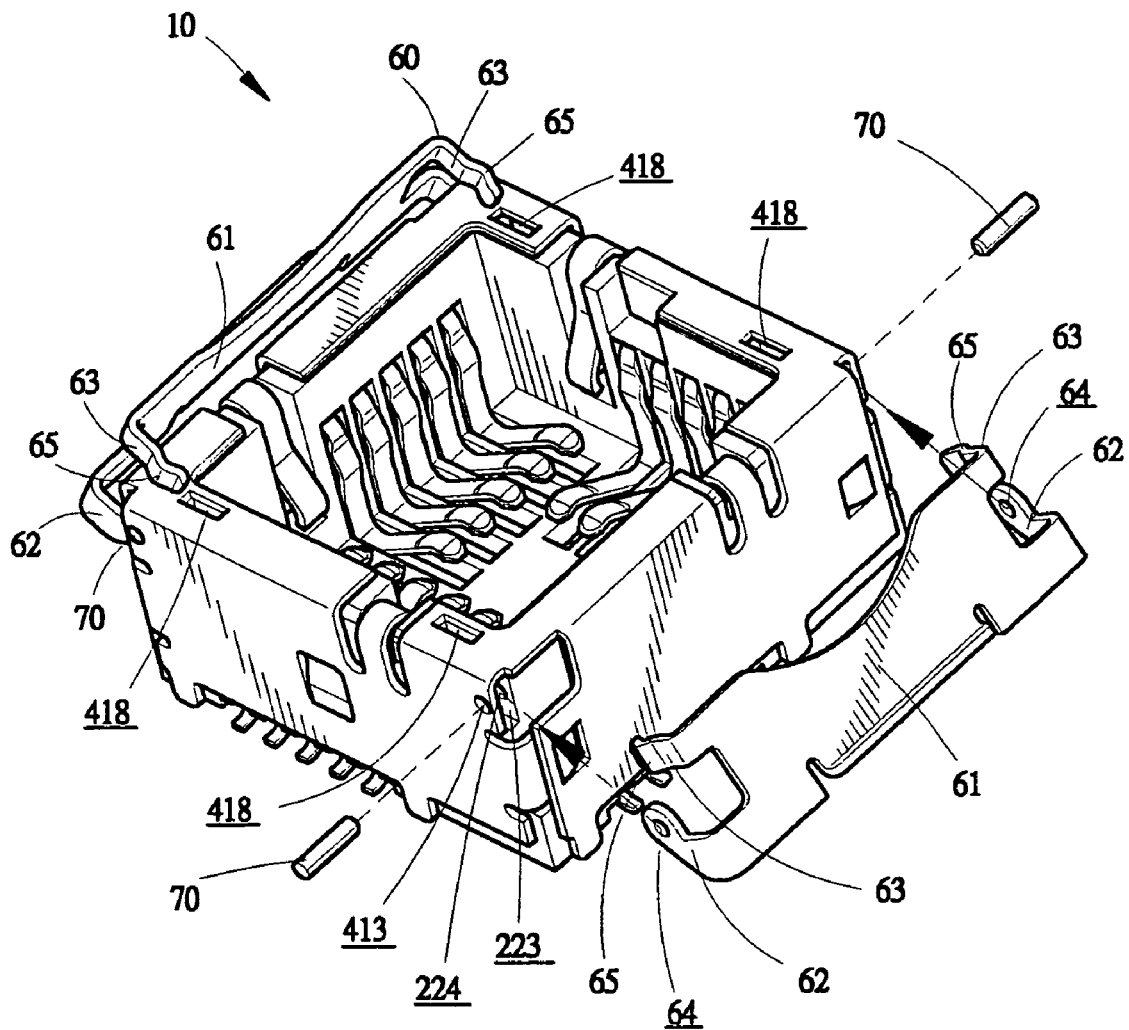
FIGS. 7, 8 and 9 are perspective views showing the assembling of a pivotal cover to the module connector.
Figure 8:
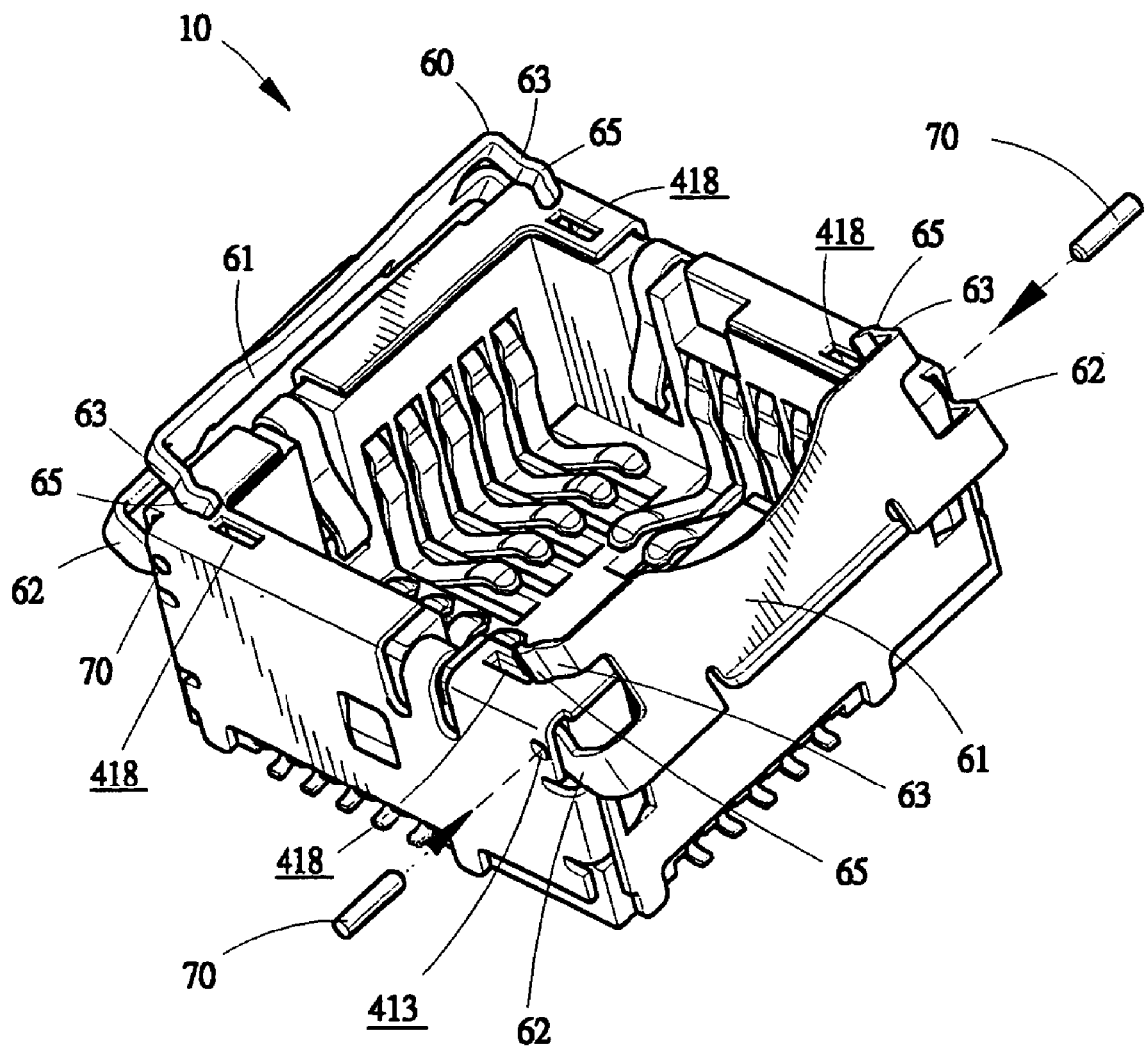
Figure 9:
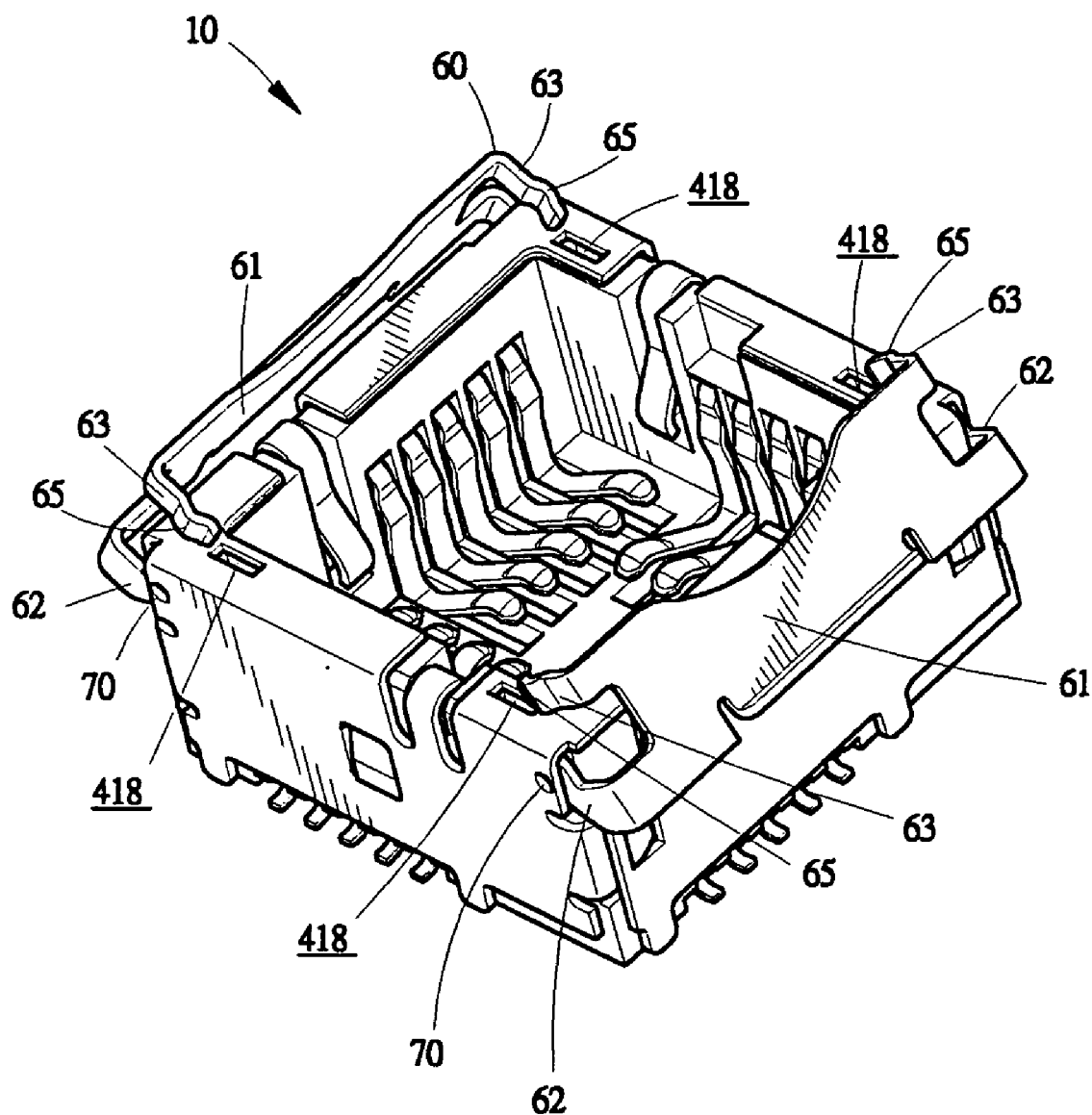

Further referring to FIGS. 7, 8 and 9, to assemble the pivotal cover 60, firstly the pivotal arms 62 of the pivotal cover 60 are inserted in the corresponding engagement-rotating recesses 223 of the housing 20 wherein the installing hole 413 of the shell 40, the corresponding positioning hole 64 of the pivotal arm 62 and the corresponding stud-receiving hole 224 of the housing 20 are coaxial and communicates with each other. Then, the positioning studs 70 each are inserted in the installing hole 413, the corresponding positioning hole 64 and the corresponding stud-receiving hole 224, thus the pivotal covers 60 are mounted on the housing 20 and the shell 40. The positioning studs 70 serve as shafts to enable the pivotal covers 60 to pivot between an open position as shown in FIGS. 9, 10 and 11 and a closed position as shown in FIG. 12.

Figure 10:
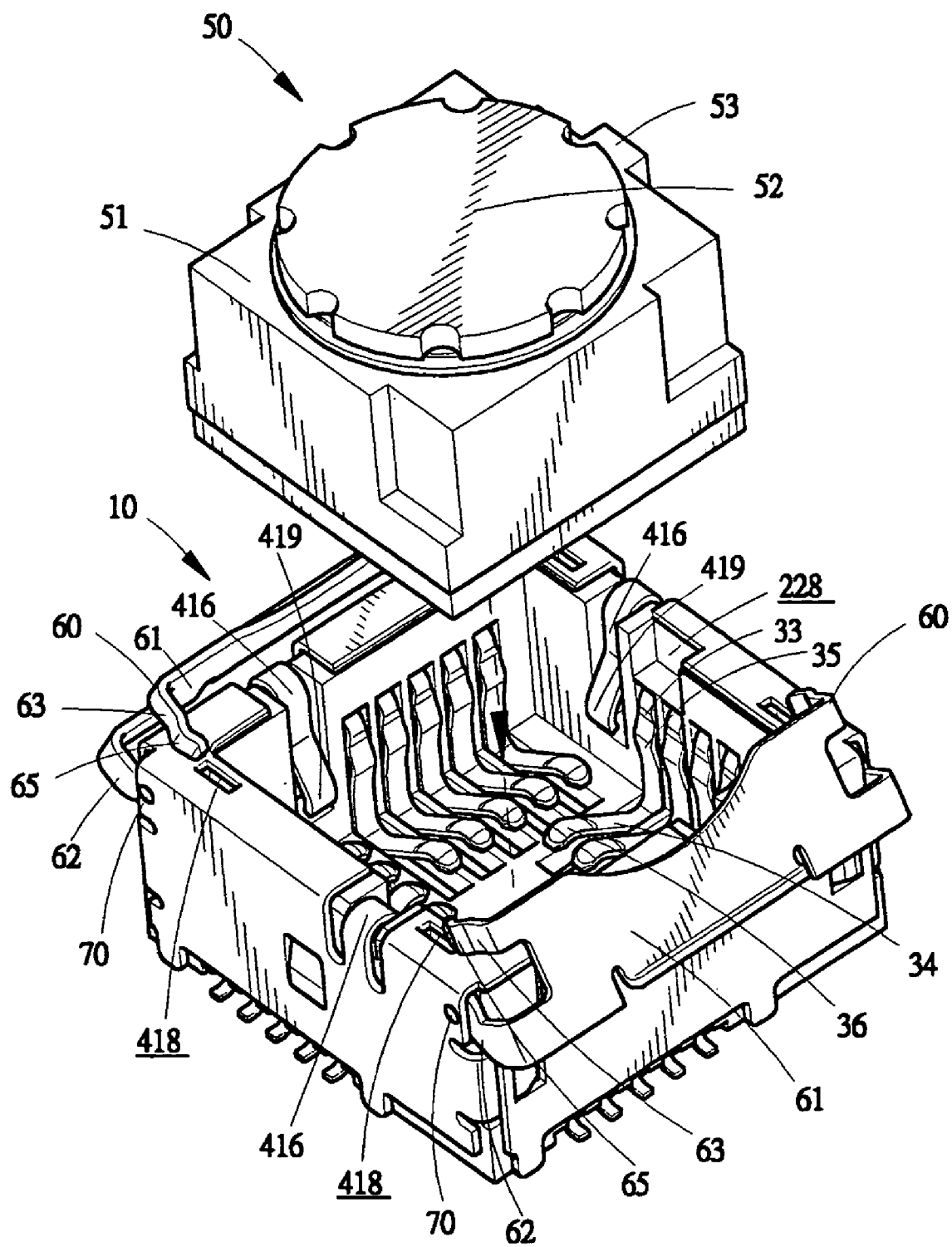
FIGS. 10, 11 and 12 are perspective views showing the assembling of a digital camera lens module to the module connector.
Figure 11:
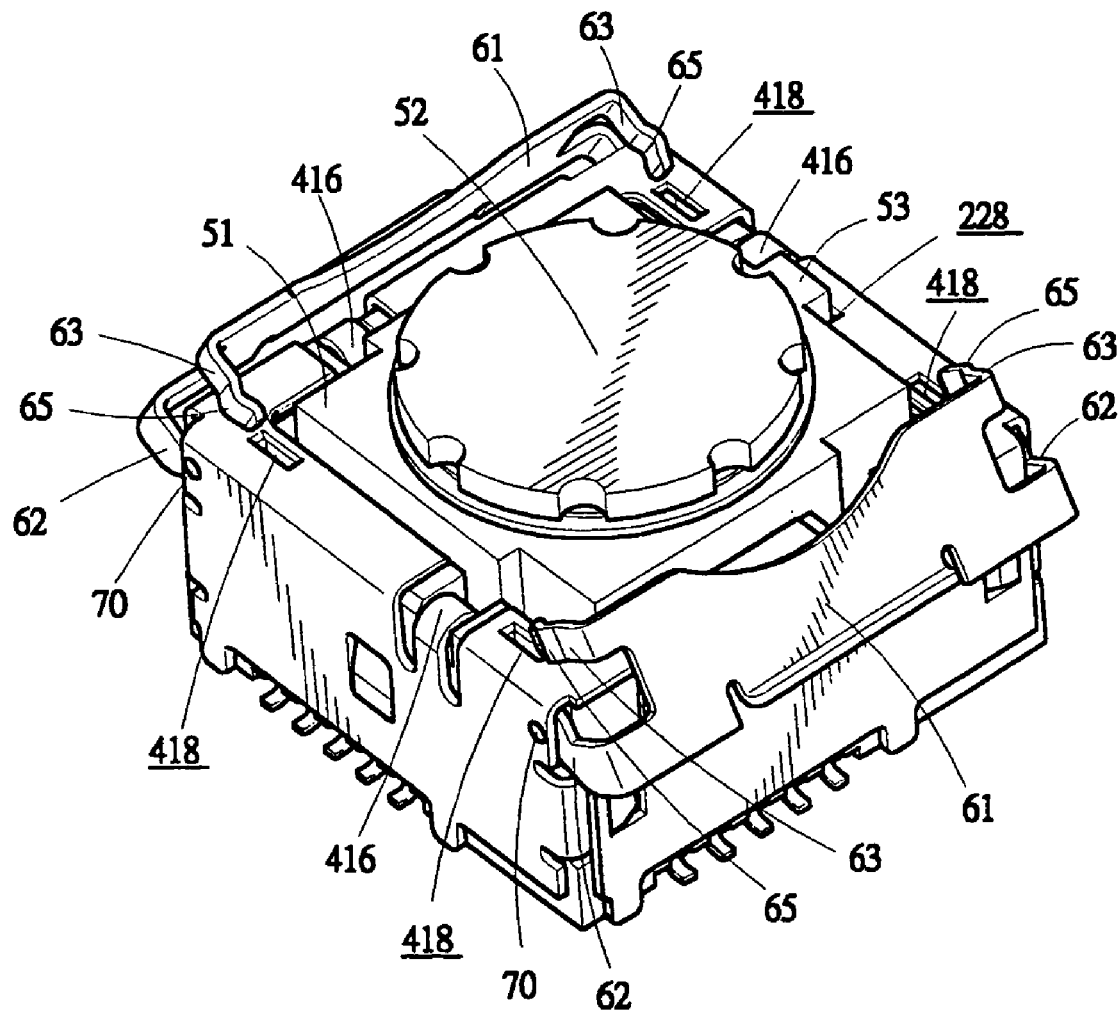
Figure 12:
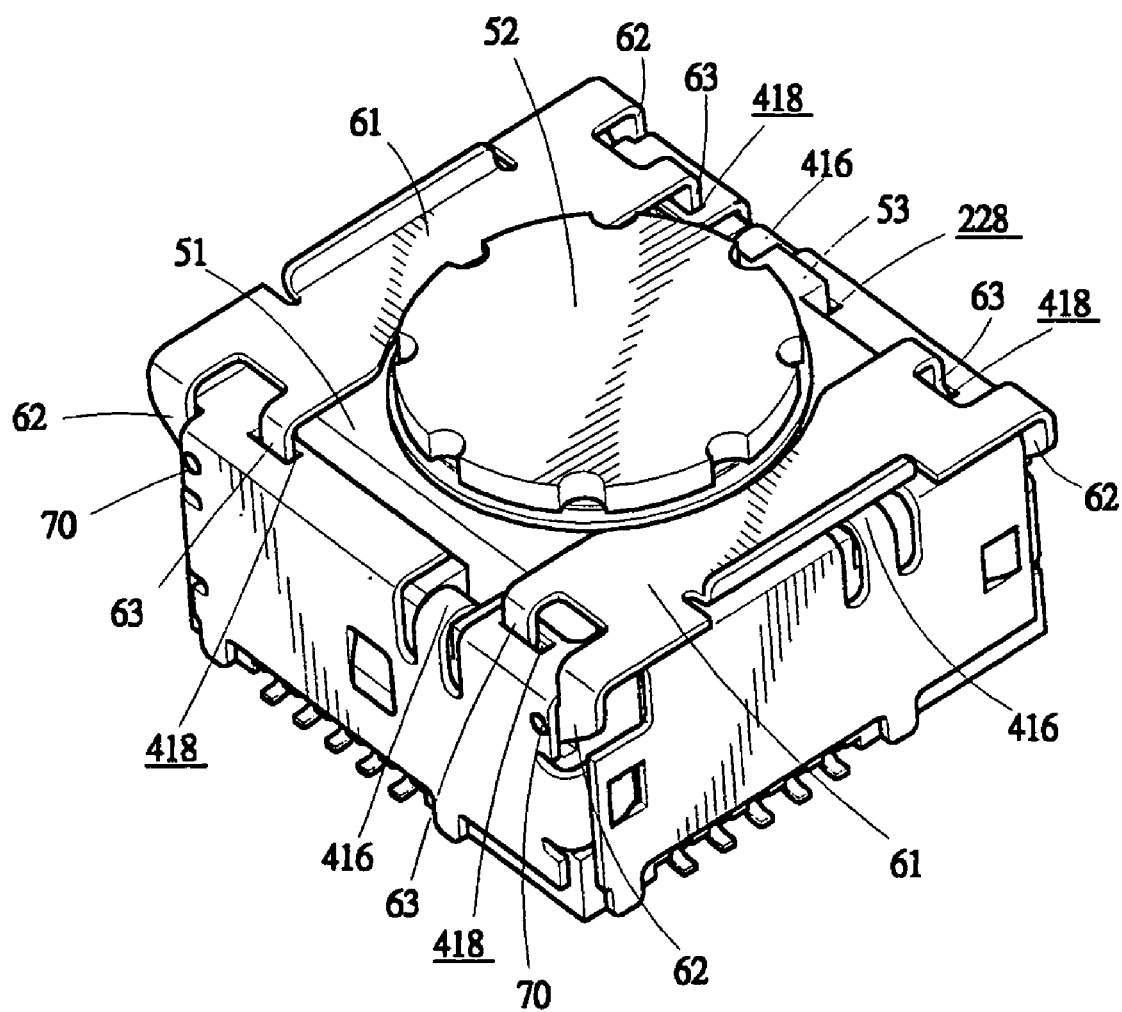

Please see FIGS. 10, 11 and 12. To assemble the lens module 50, the lens module 50 is firstly embedded in the chamber 23 with the foolproof protrusion 53 of the lens module 50 received in the foolproof recess 228 of the housing 20. At this state, the pressing points 419 of the pressing pieces 416 and the touching portions 35 of the contacts 30 prop against the sides of the base 51 of the lens module 50 to retain the lens module 50 tightly and reliably. Then, the pivotal covers 60 are moved from the open position to the closed position. In the closed position, the locking claws 63 of the pivotal covers 60 are inserted in the locking holes 418 of the shell 40 and the corresponding locking recesses 225 of the housing 20 to latch the pivotal covers 60 in the closed position. In the closed position, the top pressing covers 61 of the pivotal covers 60 presses downwardly on the top of the base 51 of the lens module 50 to prevent the lens module 50 from being pulled out from the module connector 10. The contact portions 36 of the contacts 30 are electrically contacted with the contact pads (not shown) of the lens module 50.

Figure 13:
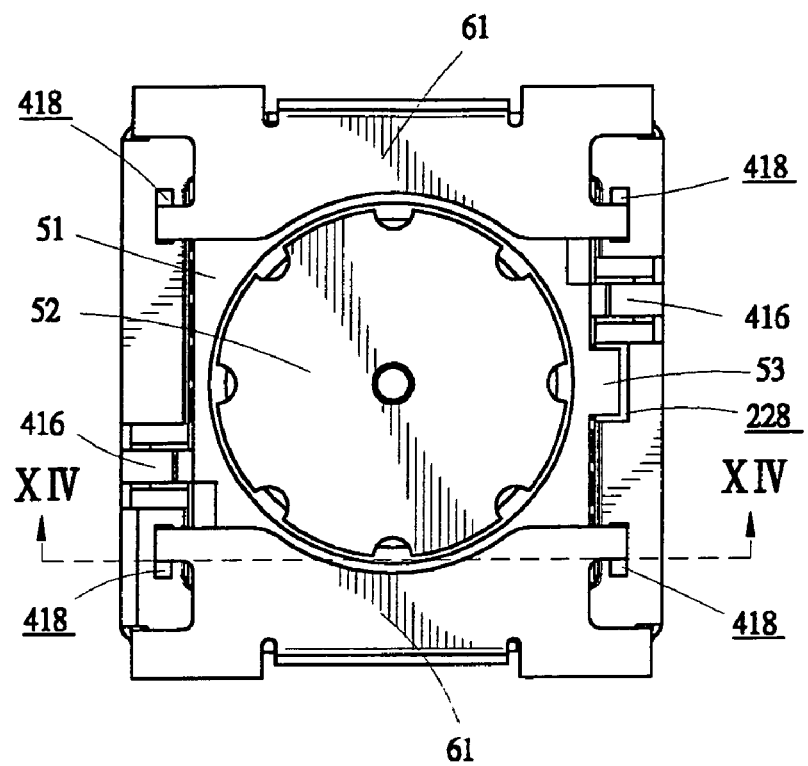
FIG. 13 is a top plan view of the assembly of the module connector and the digital camera lens module shown in FIG. 12.
Figure 14:
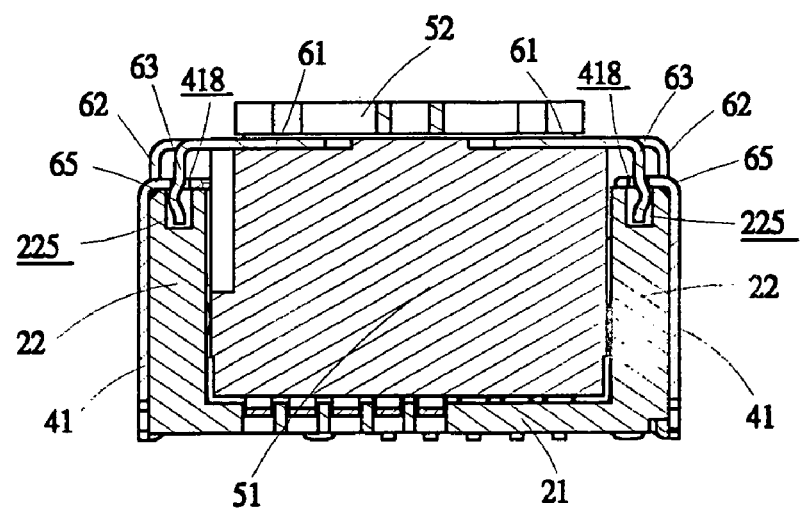
FIG. 14 is a cross-sectional view taken along line XIV—XIV of FIG. 13.

Please further refer to FIGS. 13 and 14. The locking holes 418 of the shell 40 are narrower than the corresponding locking recesses 225 of the housing 20. In the closed position, therefore, the hooks 65 of the locking claws 63 are restrained by the inner surface of the shell 40 around the locking holes 418 thereby latching the pivotal cover 60 in the closed position and in turn restraining the lens module 50 from dropping out. Furthermore, enough propping force is provided for the pivotal covers 60 to prop against the base 51 of the lens module 50 due to large contacting area between the pivotal covers 60 and the base 51 of the lens module 50. Accordingly, the lens module 50 is precisely and reliably retained in the module connector 10.

When the lens module 50 is required to be taken out from the module connector 10, it can be carried out by pressing the locking claws 63 inwardly to unlatch the hook 65 from the locking holes 418 and the locking recesses 225 and moving the pivotal covers 60 from the closed position to the open position to permit the lens module 50 to be taken out from the module connector 10. Accordingly, it is convenient to take the lens module 50 out without any damage to the lens module 50 due to without using any special tool.

Further refer to FIGS. 4, 5 and 6. The dash dotted lines shown in FIG. 4 are central lines of the respective four sides of the lens module 50. As FIG. 4 illustrated, there are four contacts 30 configured on one side of each central line and one contact 30 and one pressing piece 416 configured on the other side of each central line. As FIGS. 5 and 6 illustrated, the propping force from each pressing piece 416 against the lens module 50 is obviously bigger than the propping force from each contact 30 against the module. In the optimum state, the total moment to the lens module 50 from each pressing piece 416 and the corresponding contact 30 on one side of a central line is equal to the total moment from the other four contacts 30 on the other side of the central line, so the torque of each side of the lens module 50 is zero, thereby preventing the lens module 50 from rotating in the horizontal direction.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A module connector comprising:
   a housing having a front, an opposing rear and two opposing sidewalls which define an upwardly-open chamber adapted for receiving a module therein, each sidewall having a plurality of contact recesses;
   a plurality of locking recesses formed on a top of said front and rear sidewalls;
   a plurality of contacts received in the respective contact recesses of the housing and electrically contacting with contact pads of said module;
   at least one pivotal cover, each pivotal cover having a top pressing cover, at least a pivotal arm and at least a locking claw extending downwardly from the top pressing cover, said locking claw including a hook portion, the pivotal arm pivotally mounting the pivotal cover on the housing to enable the pivotal cover to pivot between an open position to enable the module to be inserted in the chamber and a closed position with the top pressing cover pressing downwardly on a top of the module to prevent the module from being pulled out, the locking claw being fully received in a respective one of said locking recesses when said pivotal cover is in said closed position, thereby latching the pivotal cover in the closed position and restraining said module in said module connector;
   a shell having a front, an opposing rear and two opposing side-clipping panels wrapping the respective sidewalls of the housing, each side-clipping panel having a pressing piece extending into the chamber wherein said pressing piece abuts a side of the module; and
   a plurality of locking holes formed on a top of said shell, said locking holes being in alignment with a respective one of said locking recesses and fully receiving said locking claw and restraining said hooks of said locking claw on an inner surface of said shell.

2. The module connector as claimed in claim 1, wherein the shell is a one-piece component fabricated of metal material.

3. The module connector as claimed in claim 1, wherein each contact has a touching portion extending into the chamber wherein said touching portion abuts a side of the module.

4. The module connector as claimed in claim 1, wherein the contacts and the pressing pieces are arranged in a manner in which a torque of each side of the module is almost equal to zero.

5. The module connector as claimed in claim 3, wherein each contact has an inverted U-shaped portion with one leg serving as a retention portion and the other leg serving as an elastic pressing arm; and a free end of the elastic pressing arm being bent sideways and extending slantingly and upwardly thereby forming a contact arm, said touching portion protruding outwardly from the pressing arm.

6. The module connector as claimed in claim 1, further comprising: an engagement-rotating recess located on an outside of said front and opposing rear sidewalls; a stud-receiving hole communicating with the engagement-rotating recess and open to outer sides of said front and opposing rear sidewalls; a hole corresponding to the stud-receiving hole said hole formed on said front and opposing rear side-clipping panels respectively; a positioning hole coaxial with the stud-receiving hole said positioning hole formed on said pivotal arm, thereby allowing said pivotable arm to be received in said engagement-contacting recess; and a positioning stud placed in said positioning hole and corresponding stud-receiving hole.

7. The module connector as claimed in claim 1, further comprising: a top cover being formed on each side of said shell, said top cover being bent inwardly; and wherein said locking holes in the respective top cover correspond to the locking recess for engagement with the locking claw of the pivotal cover.

* * * * *